(No Model.)
W. W. ROSENSTEEL & F. L. SHALLENBERGER.
AXLE LUBRICATOR.
No. 304,359. Patented Sept. 2, 1884.
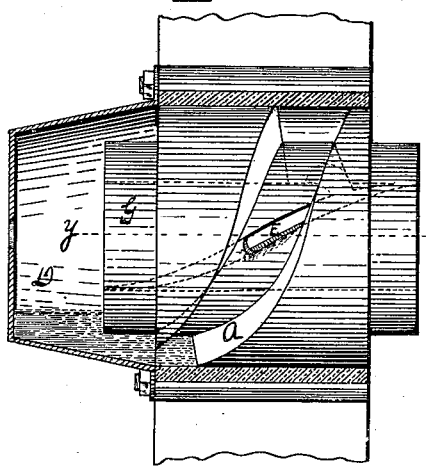
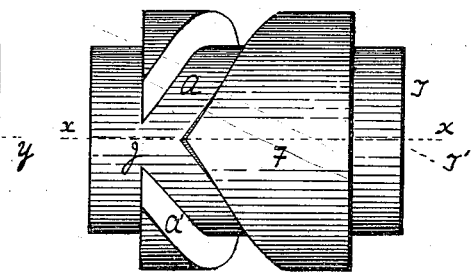
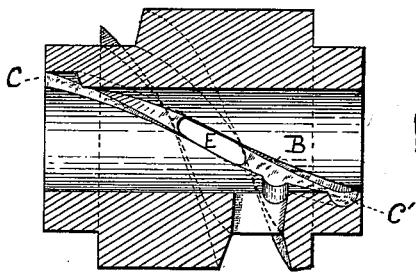
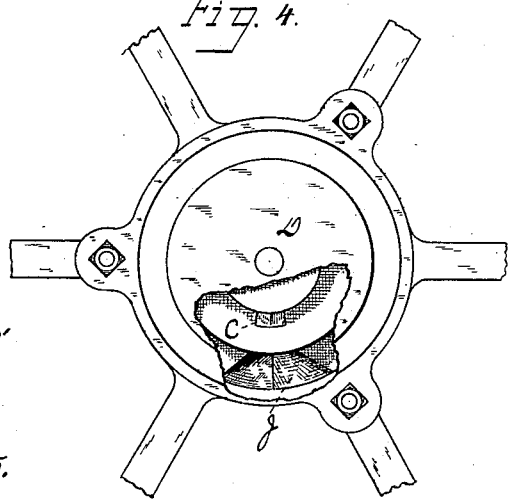
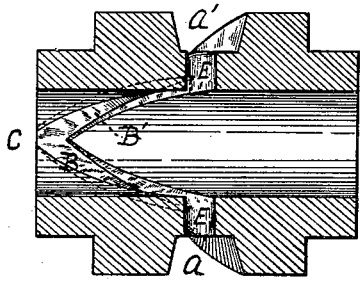
Witnesses:
J. A. Burns.
J. K. Smith
Inventors:
William W. Rosensteel
Frank L. Shallenberger
by Bakewell & Kerr
their Attorneys

United States Patent Office.

WILLIAM W. ROSENSTEEL AND FRANK L. SHALLENBERGER, OF PITTSBURG, PENNSYLVANIA, ASSIGNORS TO OLIVER BROTHERS & PHILLIPS, OF SAME PLACE.

AXLE-LUBRICATOR.

SPECIFICATION forming part of Letters Patent No. 304,359, dated September 2, 1884.

Application filed March 27, 1884. (No model.)

*To all whom it may concern:*

Be it known that we, W. W. ROSENSTEEL and F. L. SHALLENBERGER, of the city of Pittsburg, Pennsylvania, have invented a new and useful Improvement in a Device for Self Oiling or Lubricating the Axles and Bearings in Wheels, of which the following is a specification.

Our invention relates to an improvement in hubs for the wheels of cars or other vehicles in which the hub revolves around a fixed axle; and its object is to enable the hub to carry oil within itself for the lubrication of the axle in such a manner as to automatically distribute the oil thereover by the movement of the wheel. Heretofore devices for this purpose have consisted, principally, of chambers arranged around the hub, and are subject to the disadvantage that they greatly weaken the hub and distribute the oil unevenly over the journal-surface. In such devices, where slits or single grooves have been employed, no provision has been made for a continuous circulation of the oil backward and forward along the hub, and the action has on this account been imperfect. By use of our improvement these faults are avoided and a durable, economical, and effective device for oiling axles is provided.

Our invention consists, principally, in providing the hub of a wheel with two spiral channels, which, from the front or outer face of the hub, preferably from a common point thereat, extend thence in opposite directions within the body of the hub toward its butt, at or near which point they connect, and thus form a continuous passage outside the axle-bore from one end of the hub to the other and back again.

It also consists in combining with these channels two corresponding interior grooves, which, from points at the front of the hub, extend in a like manner along the surface of the bore of the hub toward the butt, where they likewise meet or intersect, thus forming a continuous passage backward and forward along the surface of the bore. The direction and length of the channels and grooves should be such that they may be in apposition at several points along their length, preferably at their ends and at points near the middle of each groove and channel. These channels and grooves connect with a suitable oil-reservoir, in manner and for the purpose which we will explain hereinafter.

We will now proceed to describe our invention, so that others skilled in the art to which it appertains may manufacture and use it, reference being had to the drawings which accompany and form part of this specification, in which—

Figure 1 is a side elevation, partly in section, of a hub showing our improvement. Fig. 2 is a plan view of the same, illustrating the formation of the outer channels. Fig. 3 is a horizontal section on the line $x\ x$, Fig. 2. Fig. 4 is an end view of the hub, showing the oil-reservoir partly broken away for purposes of illustration. Fig. 5 is a horizontal section on the line $y\ y$, Fig. 1.

In Figs. 1, 2, and 3 the outer crust of the hub is shown broken away, so as to expose the outer channels to view; and in each figure like letters of reference indicate like parts.

In the drawings, F represents the body of the hub, T the butt of the same, and G the outer projection, which is usual on many forms of hub.

Starting at the point J, at the face of the hub, are the two divergent channels A' A, which pass thence through the hub and longitudinally with its axis toward the butt T, where they converge and meet at the point T'. The inner grooves above mentioned are shown in Figs. 3 and 5, where they are indicated by the letters B B'. They extend from a common point, C, at the outer face of the hub, preferably directly opposite the outer point of union of the channels A A', along the surface of the bore of the hub and toward the butt, where they meet again at a point, C', preferably opposite T', the place of the union of the outer channels. The grooves B B' and the channels A A' should be relatively situate so that each channel may be opposite to a groove at one or more points along its length. At these points they are joined by holes or passages E. Any desired number of pairs of grooves and channels may be used. The face of the hub is covered by a cap or oil-vessel, D, suitably fastened to the hub in any desired manner.

Thus constructed, the operation of our improvement is as follows: The cap D having been partially filled with oil sufficient to cover the mouth of the channels A A' at their outer junction, revolution of the wheel will cause the oil to enter one of the channels and to pass along the course of the same to the point T', and thence back through the other channel to the cap or vessel D. In this way there is produced a constant circulation of the oil along these channels during the revolution of the wheels, as will be readily understood. The direction of motion of the car will determine which of the channels A A' the oil will first enter from the cap. During the passage of the oil through the channels A A' it crosses the openings E, and a part thereof falls through them into the inner grooves, B B'. The oil which passes through the first opening, E, goes into the groove B, and by the revolution of the wheel is carried therethrough to the point C', and thence along the groove B' to the cap, where any surplus oil is discharged. Part of the oil, however, will pass over the first opening, E, and will not fall into the groove until it reaches an opening in the second channel, A'. It will then go into the groove B', and will be discharged thence directly into the cap D. The grooves B B' being contiguous to the axle of the vehicle and extending along the same over its entire bearing-surface within the hub, the oil will be distributed evenly and regularly. Either the channels A A' or the grooves B B' may be made spiral, or may be within planes intersecting the hub at an inclination to its axis, as desired.

The chief advantages of our improvement are as follows: It has always been found difficult in the use of axle-lubricators to supply oil to the part near the butt of the hub, since the oil naturally tends to work outward toward the face of the hub. This difficulty is effectually overcome by our improvement, since the inclination of the channels throws the oil back to the butt of the wheel and discharges it there upon the axle. Another advantage is that the spiral form of the channels and the small depth to which they need be cut prevent weakening of the wheel. By placing the reservoir D on the outside of the hub, it catches all the drip of the oil as it comes through the inner grooves or works outward along the surface of the axle.

The advantage of employing the outer channels, A A', in combination with the grooves B B', is that it enables us to employ less oil than if only the inner grooves were used, and it distributes it over the axle in a more uniform and cleanly manner.

One of the chief advantages is the ease by which our improved hub may be cleaned and the effective manner in which it excludes dirt and grit.

The grooves B B' may be made quite small, so as not to injure the bearing-surface of the hub. If desired, they may be altered in form, or substituted by suitable pockets or recesses communicating with the outer channel.

Having thus described our improvement, what we claim as our invention, and desire to secure by Letters Patent, is—

1. A hub for the wheels of cars or other vehicles, having spiral channels extending in opposite directions through the hub longitudinally with the axis thereof, and communicating with each other at or near one end of the hub and with a suitable oil-receptacle at the other end of the same, said channels being separate from the bore of the hub, but communicating therewith through openings or passages E, substantially as and for the purposes specified.

2. The combination, in a hub for the wheels of cars or other vehicles, with a suitable oil-receptacle, of the right-and-left spiral channels, A A', extending from said receptacle through the body of the hub substantially parallel with the axis thereof, and communicating with each other at or near one end of said hub, and the inner right-and-left spiral grooves formed on the surface of the bore of the hub, and communicating with each other at one end of their course and with said oil-receptacle at the other end of the same, said channels communicating with said grooves through transverse passages E, substantially as and for the purposes specified.

In witness whereof we have affixed our names.

WILLIAM W. ROSENSTEEL.
FRANK L. SHALLENBERGER.

Witnesses:
JNO. M. PHILLIPS, Jr.,
HARRY E. BRAY.